(12) United States Patent
Vos et al.

(10) Patent No.: US 7,011,498 B2
(45) Date of Patent: Mar. 14, 2006

(54) OPTIMIZATION METHOD FOR POWER GENERATION SYSTEMS

(75) Inventors: David W. Vos, Boston, MA (US); Benjamin Russ, Catlett, VA (US)

(73) Assignee: Athena Technologies, Inc., Warrenton, VA (US)

( * ) Notice: Subject to any disclaimer, the term of this patent is extended or adjusted under 35 U.S.C. 154(b) by 417 days.

(21) Appl. No.: 10/051,304

(22) Filed: Jan. 22, 2002

(65) Prior Publication Data

Related U.S. Application Data

(63) Continuation-in-part of application No. 09/729,457, filed on Dec. 5, 2000, now Pat. No. 6,340,289, which is a continuation of application No. 09/054,411, filed on Apr. 3, 1998, now Pat. No. 6,171,055.

(51) Int. Cl.
B63H 3/10 (2006.01)
B64C 11/30 (2006.01)
F01D 7/00 (2006.01)
F04D 29/18 (2006.01)
F04D 29/26 (2006.01)

(52) U.S. Cl. .......................... 416/28; 60/238; 60/239; 701/7; 701/10; 416/27

(58) Field of Classification Search ................ 60/233, 60/238, 239, 240, 39.24, 39.22, 39.27, 39.281, 60/794; 416/28, 27; 701/7, 10
See application file for complete search history.

(56) References Cited

U.S. PATENT DOCUMENTS

| | | | | |
|---|---|---|---|---|
| 2,759,549 A | * | 8/1956 | Best ............................ | 416/28 |
| 2,796,733 A | * | 6/1957 | Pearl et al. .............. | 60/39.281 |
| 2,851,855 A | * | 9/1958 | Gamble ................... | 60/39.281 |
| 2,910,125 A | * | 10/1959 | Best ............................ | 416/28 |
| 3,196,613 A | * | 7/1965 | Stearns et al. ........... | 60/39.281 |
| 3,289,411 A | * | 12/1966 | McCombs, Jr. .............. | 60/237 |
| 3,469,395 A | * | 9/1969 | Ranke et al. ............. | 60/39.281 |
| 3,523,423 A | * | 8/1970 | Young .......................... | 60/236 |
| 3,719,047 A | * | 3/1973 | Briotet et al. ................. | 60/239 |
| 3,854,287 A | * | 12/1974 | Rembold ...................... | 60/236 |
| 3,936,226 A | * | 2/1976 | Harner et al. .................. | 416/28 |
| 3,977,187 A | * | 8/1976 | Guillaume .................... | 60/233 |
| 4,159,625 A | * | 7/1979 | Kerr ............................ | 60/204 |
| 4,275,557 A | * | 6/1981 | Marvin et al. ................ | 60/773 |
| 4,437,303 A | * | 3/1984 | Cantwell ................. | 60/39.281 |
| 4,686,825 A | * | 8/1987 | Cavasa et al. ................ | 60/243 |
| 4,958,289 A | * | 9/1990 | Sum et al. .................... | 701/99 |
| 5,197,280 A | * | 3/1993 | Carpenter et al. ............ | 60/204 |
| 5,209,640 A | * | 5/1993 | Moriya ........................ | 416/27 |
| 5,303,545 A | * | 4/1994 | Larkin ......................... | 60/239 |
| 5,440,490 A | * | 8/1995 | Summerfield ............... | 701/100 |
| 5,810,560 A | * | 9/1998 | Tanaka ........................ | 415/27 |

(Continued)

*Primary Examiner*—William H. Rodriguez
(74) *Attorney, Agent, or Firm*—Finnegan, Henderson, Farabow, Garrett & Dunner, LLP

(57) ABSTRACT

Apparatus for controlling the power output efficiency of a power generation system based on an operator input. A processor is coupled to the input means and (i) receives the generated operator command, (ii) receives a plurality of detected ambient air conditions, (iii) receives a plurality of detected engine performance parameters, (iv) determines first and second engine control commands based on the received pilot thrust command, the detected ambient environmental conditions, and the engine performance parameters, and (v) outputs control commands to optimize the efficiency of the power generation system.

16 Claims, 7 Drawing Sheets

U.S. PATENT DOCUMENTS

| | | | |
|---|---|---|---|
| 6,171,055 B1 * | 1/2001 | Vos et al. | 416/1 |
| 6,340,289 B1 * | 1/2002 | Vos et al. | 416/1 |
| 6,353,790 B1 * | 3/2002 | Tsuzuki | 701/100 |
| 6,379,114 B1 * | 4/2002 | Schott et al. | 416/1 |
| 6,434,473 B1 * | 8/2002 | Hattori | 101/100 |
| 6,732,521 B1 * | 5/2004 | Otake | 60/601 |

* cited by examiner

OPTIMIZATION METHOD FOR POWER GENERATION SYSTEMS

RELATED APPLICATION

This application is a continuation-in-part of patent application Ser. No. 09/729,457 filed Dec. 5, 2000, now U.S. Pat. No. 6,340,289, which is a continuation of patent application Ser. No. 09/054,411 filed Apr. 3, 1998, now U.S. Pat. No. 6,171,055, and is incorporated herein by reference.

BACKGROUND OF THE INVENTION

1. Field of the Invention

The present invention relates to method and apparatus for controlling the output of a power generation system using a single input power controller.

2. Related Background

In the field of engine control, many proposals exist for controlling the flow of fuel to the engine in accordance with detected engine operating parameters such as engine temperature, engine pressure ratio, shaft speed, etc. to maximize fuel efficiency, but such proposals fail to take into account the ambient operating conditions. Proposals of this type are described in U.S. Pat. Nos. 4,248,042; 4,551,972; 4,686,825; 5,029,778; 5,039,037; 5,277,024; and 5,613,652. However, even if such systems were adapted to power generation systems such as used by electric utilities, technicians would still be required to operate and continually adjust a plurality of control levers to optimize engine output for given environmental conditions.

By 1985, it was recognized that aircraft engine efficiency is highest when the engine is run with the throttle butterfly valve fully open and the desired performance is obtained by varying propeller speed. See, for example, SAE Technical Paper Series 850895, The Porsche Aircraft Engine P F M 3200", Helmuth Bott and Heinz Dorsch, 1985. This article proposed a single-lever control system for an aircraft engine that operates both the throttle and the propeller governor with a single lever. However, the proposed system is a mechanical linkage system which accordingly cannot optimize engine performance based on various ambient flight conditions. That is, the Porsche system may work well at a single altitude, speed, and temperature, but will seriously degrade at other flight conditions.

Similarly, it may be advantageous in a power generation system, to allow the prime mover or engine to operate at a full throttle condition, while manipulating the attached electrical generator and/or connecting gear box to achieve maximum efficiency based on current environmental parameters. This approach may also be applied to wind turbine applications as well as propulsion systems for ground vehicles.

SUMMARY OF THE INVENTION

The present invention is intended to overcome the drawbacks of known power generation control systems by providing a processor-controlled system which inputs a single power command, receives detected ambient environmental conditions, and automatically controls the engine/generator output, and engine load (e.g., manifold air pressure (MAP)) for the detected environmental conditions relative to the requested power command.

According to a first aspect of the present invention, a single input power control apparatus for controlling a power generation system includes a single, manually-operable input for generating a power level generation command. A processor receives the generated power level command, receives a plurality of detected ambient air conditions, and determines an engine speed activation command and an engine load activation command based on the maximum output power efficiency for the detected ambient environmental conditions and power level command. In one embodiment, the output power efficiency optimization is performed off-line where the processor accesses a look-up table which stores highest output power efficiency values for the detected environmental conditions and power level command. In another embodiment, the optimization is performed on-line where the processor determines the highest output power efficiency values by varying the existing values and determining any change in the power output. A positive change indicates more efficient output power values, and these will be used to control the engine.

Similarly, according to a further aspect of the present invention, control apparatus for use with a wind power generator control device includes an electrical power generator connected to a propeller of a wind turbine. A processor receives a generated power level command, receives a plurality of detected ambient air conditions, and determines a gear box speed activation command and a propeller load activation command based on the maximum output power efficiency for the detected ambient environmental conditions and power level command. Output from the wind turbine is automatically controlled by altering the pitch of the turbine blades in accordance with the output of the processor, thereby selecting the most efficient operating condition for the wind turbine.

According to another aspect of the present invention, apparatus for controlling a ground vehicle engine having an internal combustion engine and an air inlet includes a single, manually-activated structure for providing an engine thrust command such as an accelerator pedal or a remote command in the case of an unmanned vehicle. A processor is provided for receiving the engine output command and detected ambient air conditions, and determines first and second control commands for the engine. The processor determines the first and second control commands based on the received engine output command, the detected ambient air conditions, and a maximum engine output efficiency value for the detected ambient air conditions.

BRIEF DESCRIPTION OF THE DRAWINGS

The novel structure and functions according to the present invention will become readily apparent to those of ordinary skill in the art from the following detailed description of the preferred embodiments taken together with the accompanying drawings which show.

DETAILED DESCRIPTION OF THE PREFERRED EMBODIMENTS

1. Introduction

Power plants for power generation are typically comprised of a plurality of prime power sources such as turbine engines, gas powered internal combustion engines and the like each connected to a generator through a variable speed transmission/gear box. The engine burns fuel thereby converting the fuel into electrical energy that is in turn produced by the generator. The efficiency of the power generation system may be improved by monitoring environmental parameters and selecting setpoints for controlling engine speed and generator output based on the known performance of the system.

Similarly, a wind turbine produces electrical energy by converting the energy in the wind into rotation of a propeller which is connected to an electrical generator by a variable speed transmission. Wind turbine power generators, however, do not always operate at maximum efficiency based on measurable environmental conditions and operating parameters. Overall wind turbine operating efficiency may be improved by monitoring the environmental parameters and selecting setpoints of the wind turbine and the generator/gear box to provide maximum output power efficiency. Alternatively, if power shedding capabilities exist, the load on the generator may be varied to also maximize wind turbine efficiency.

In yet another example of power generation, a prime mover such as an internal combustion engine is provided in a ground vehicle to transmit power to the wheels of the vehicle to move the vehicle along the ground at some desired speed. Overall prime mover efficiency may be improved by monitoring operating parameters such as transmission/wheel speed and engine speed to find the optimum operating setpoints for the engine and/or transmission.

The present invention dovetails nicely with the advances recently made in electronic control of engine parameters such as fuel mixture, operating temperature, etc. Engine control units (ECU=s) and power plant control units (PCU's) are used in the automotive industry to digitally fine-tune fuel consumption in the power plant.

While the present invention is described with respect to power generation systems such as wind turbines and ground vehicles, those skilled in the art will appreciate that other applications may include many other well known power generation systems.

2. The Structure

Figure 1:
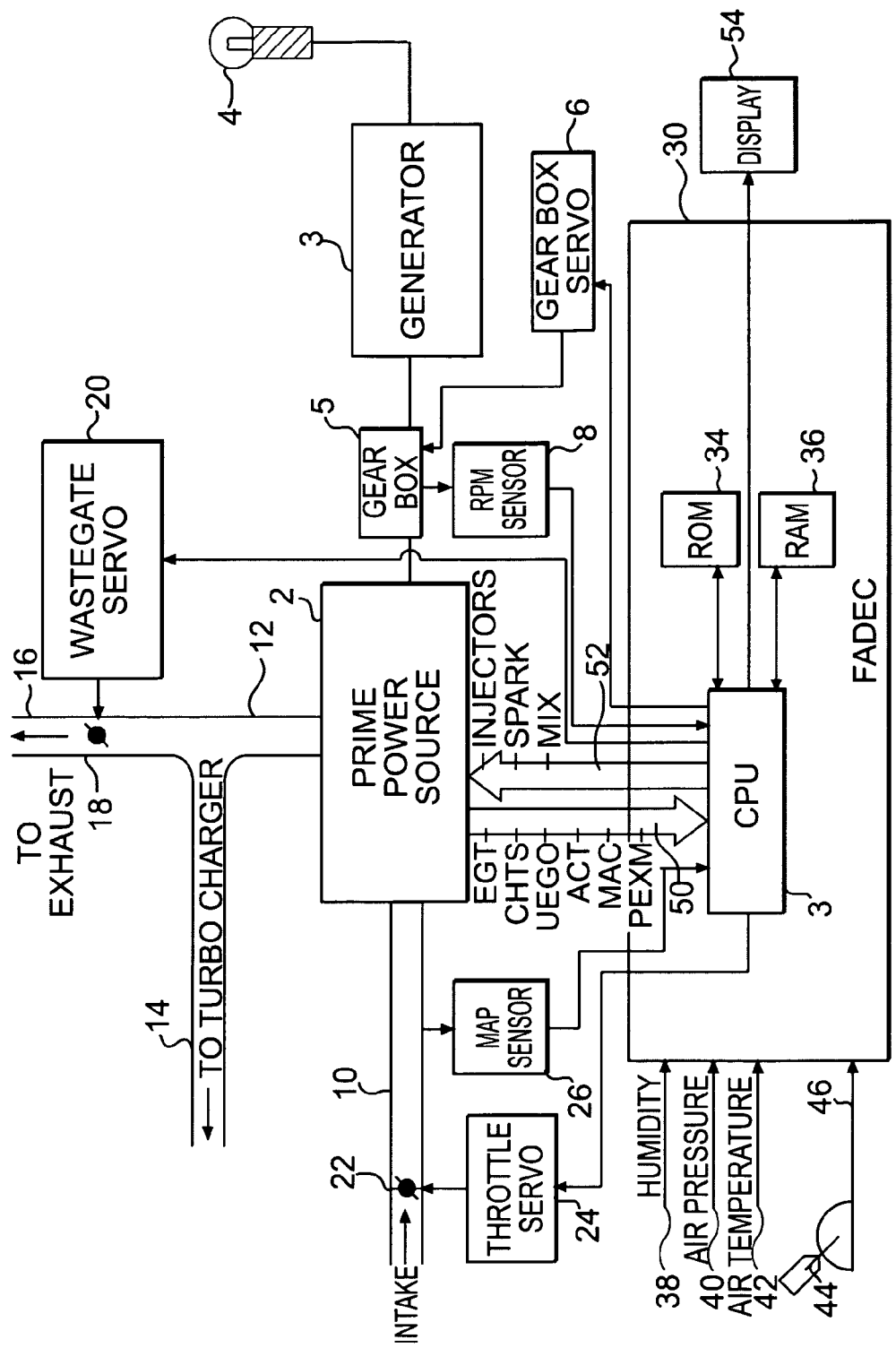
FIG. 1 is a block diagram of the power generation structure according to one embodiment of the present invention.

FIG. 1 depicts the structure according to a preferred embodiment of the present invention in which prime power source 2 comprises a known prime power source for use in power generation stations, for example, a gas fired internal combustion engine, a high speed turbine engine or the like. An electrical generator 3 is connected to the prime power source 2 by a gear box 5. The gear box 5 may be a variable speed transmission that can be controlled by an output from the controller. Load 4 may comprise any known electrical power transmission means for transmission of the electrical power generated by the generator 3.

Prime power source 2 has an intake manifold 10 and an exhaust manifold 12. The exhaust manifold 12 has two branches, a branch 14 which may provide output to an optional turbo charger (not shown), and a branch 16 which is vented to the atmosphere. An optional movable waste gate 18 controls the balance of exhaust gases between branch 14 and 16 so as to control the amount of exhaust gases provided to the turbo charger 14. A waste gate servo 20 controls the position of the waste gate valve 18 in accordance with feedback from the measured intake manifold pressure (to be described below).

The intake manifold 10 has a movable throttle valve 22 which is controlled by a throttle servo 24. A manifold air pressure (MAP) sensor 26 detects the intake manifold air pressure.

The control electronics are encompassed in a Full Authority Digital Electronic Control (FADEC) 30. The FADEC 30 includes, inter alia, a CPU unit 32, a ROM 34, and a RAM 36. In the present embodiment, the FADEC 30 is a 16 bit microcontroller based on the Intel 8096 microprocessor which was used in previous generations of Ford engine ECU'S. The fuel is metered and fuel injection is controlled by the FADEC using the speed-density method. The system features distributorless electronic ignition with double fire capacity. The FADEC controller is housed in a sealed enclosure with liquid cooling for high altitude applications. The integration of the single input power controller (SIPC) software was found, in the present embodiment, to be most efficient as a sub-routine of the FADEC control program. The SIPC subroutine receives the relevant power plant parameters (to be discussed below), performs the SIPC algorithms (also to be discussed below) and delivers control parameters at the end of each control cycle. The FADEC software also controls engine performance parameters such as injection, spark, mix, etc. (To be discussed below).

Inputs to the FADEC which are used in the SIPC algorithm include environmental condition inputs such as the humidity 38, the ambient air pressure 40, and the ambient air temperature 42. Input from the single input 44 is provided to the FADEC 30 through the line 46.

The FADEC 30 receives inputs from the various engine control sensors and provides control outputs to the various servos as depicted in FIG. 1. Specifically, the CPU 32 outputs throttle servo commands to the throttle servo 24, and receives MAP sensor signals from the MAP sensor 26. The CPU 32 also receives RPM sensor signals from the RPM sensor 8.

For controlling the engine performance parameters, the CPU 32 also receives a number of engine status parameters such as Exhaust Gas Temperature (EGT), Cylinder Head Temperature signals (CHTs), Universal Exhaust Gas Oxygen sensor signals (UEGO), Air Charge Temperature signals (ACT), Mass Airflow signals (MAF), and the Exhaust Pressure Signals (PEXH), over a bus 50. In the preferred embodiment, these signals comprise analog signals which may vary between −10 and +10 volts, preferably + or −5 volts, or as available.

The CPU 32 outputs to the prime power source 2 control signals to control the injectors, the spark, and the fuel/air mix, on a bus 52. Again, in the preferred embodiment, the signals are analog signals varying between 0 and 5 volts, or as required. Of course, some or all of the signals provided into and out of the FADEC may be digital signals.

A display 54 may be coupled to the FADEC 30 to display the MAP command and/or the generator RPM command. For example, where the system according to the present invention is advisory only and does not actually output commands to change engine and generator performance, displayed MAP and RPM commands may provide the operator with suggested settings for the throttle servo 24.

3. The Functions

Figure 2:
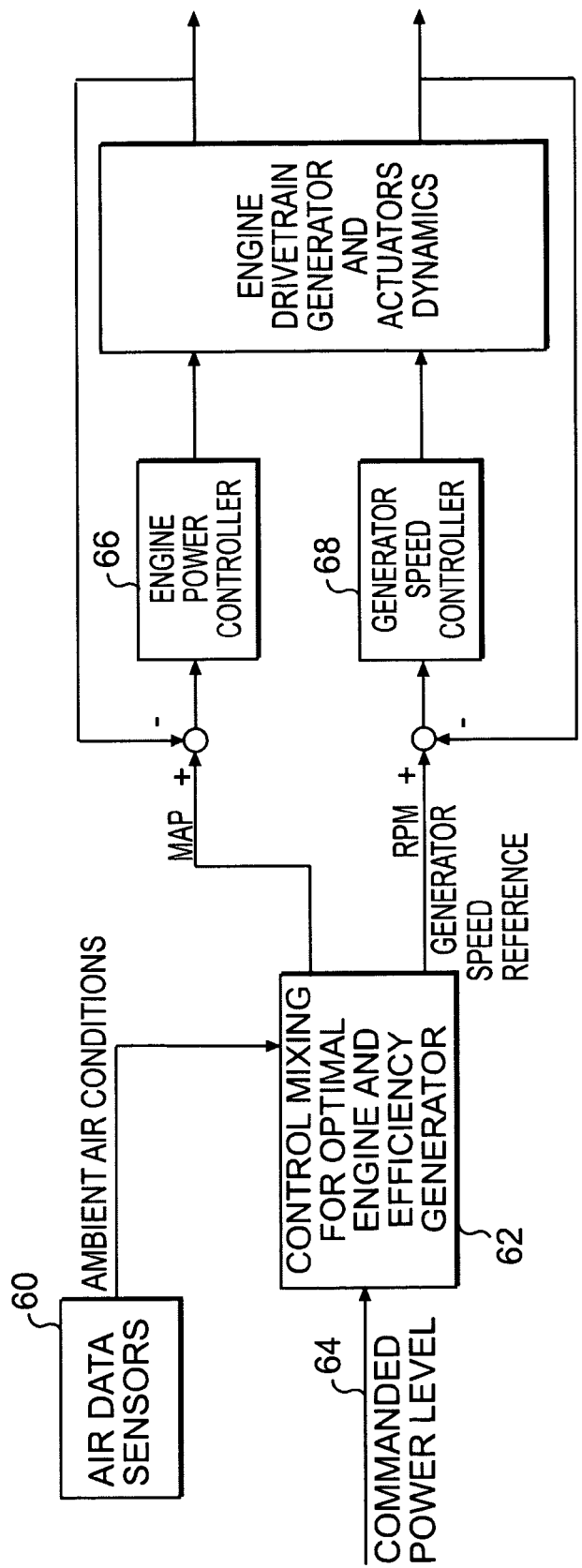
FIG. 2 is a functional block diagram of the embodiment depicted in FIG. 1.

FIG. 2 is a functional block diagram showing the salient features of the SIPC algorithm. Briefly, the FADEC 30 (FIG. 1) receives both the detected environmental conditions and the commanded power output, and uses these values to access one or more look-up tables stored in ROM 34 or RAM 36. The look-up table will provide an RPM command and a MAP command which will achieve the best output power efficiency for the detected values. The control algorithm and the look-up tables can be loaded into an existing computer from a disk. Alternatively, the algorithm and look-up tables may be provided in a separate computer to provide the operator with an advisory message rather than activate the control servos.

In more detail, the system constantly monitors the air data 60, thus knowing the ambient air conditions. This information is employed in the control mixing algorithm 62 to select the optimum combination of the engine speed and power (or load) setting to maximize the output power efficiency achieved, i.e., maximum efficiency of the combined prime power source and generator at the detected environmental condition.

In operation, the operator commands the desired output power percentage 64 by using the single input means 44 (FIG. 1). The control mixing algorithm (preferably, a software subroutine running in the FADEC 30) transforms the input output power percentage into a MAP set point to control the engine power/load controller 66 which, in the proposed embodiment, drives the throttle servo 24 and the waste gate servo 20 (FIG. 1) to achieve the desired inlet manifold pressure. On non-turbo charged engines, the throttle servo alone is driven to achieve the desired inlet manifold air pressure. The control algorithm 62 also outputs a generator speed set point (RPM) to the generator speed controller 68 which, in the preferred embodiment, includes gear box servo 6, to control generator speed by actuating the variable speed transmission until the measured speed matches the speed set point.

With the desired output power indicated by the input 44, the control mixing algorithm 62 interpolates stored tabulated data (to be discussed below) to determine the MAP and RPM that will maximize output power efficiency at this commanded output power level. Such an interpolation must be handled very carefully, since the optimum MAP and RPM positions may not follow well-defined, linear functions. For example, the optimum conditions may follow irregular boundaries of MAP and RPM.

The power output of prime power source 2 is controlled in operation by two primary variables, MAP and RPM. The power output and specific fuel consumption are characterized by testing and/or prediction as functions of MAP and RPM. The generator is characterized by maps of power coefficient and efficiency, which in turn are functions of RPM, density, and load. The optimization algorithm maximizes the output power efficiency of the combined power generation system.

Figure 5:
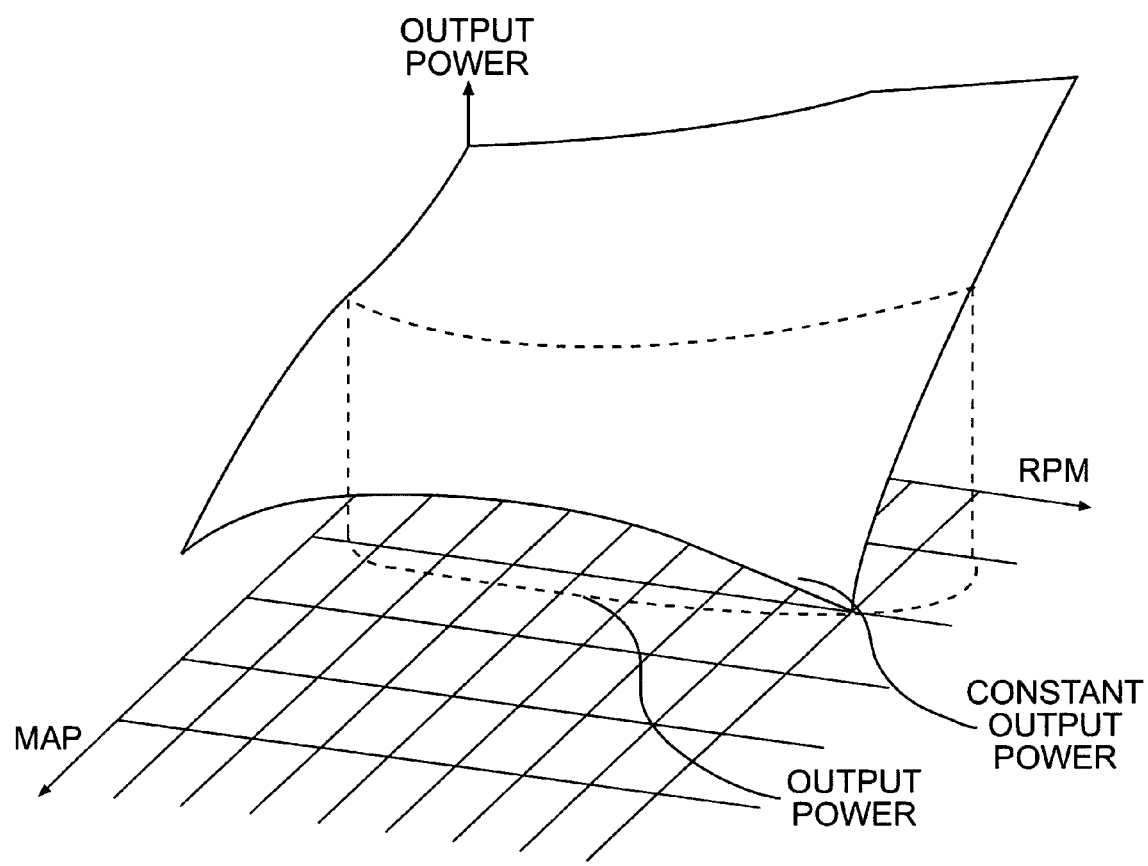
FIG. 5 is a contour map representing output power vs. MAP vs. RPM in accordance with the embodiment shown in FIG. 1.
Figure 6:
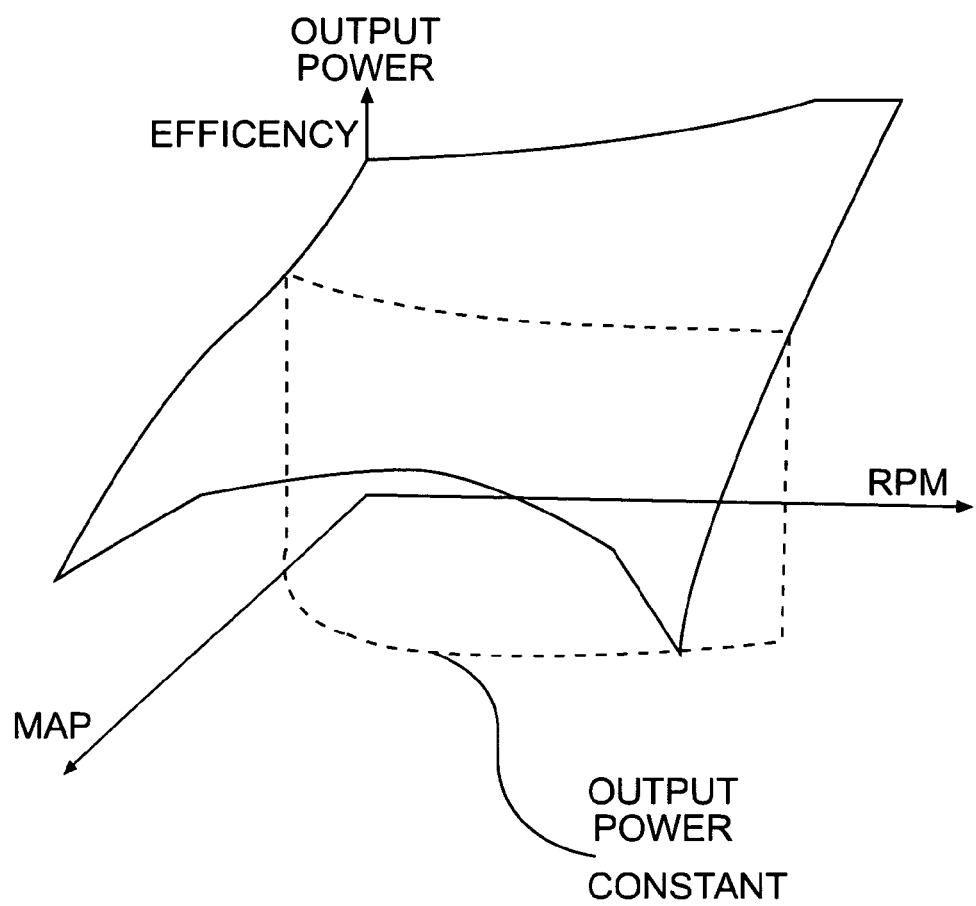
FIG. 6 is a contour map showing constant output power in accordance with the embodiment shown in FIG. 1.
Figure 7:
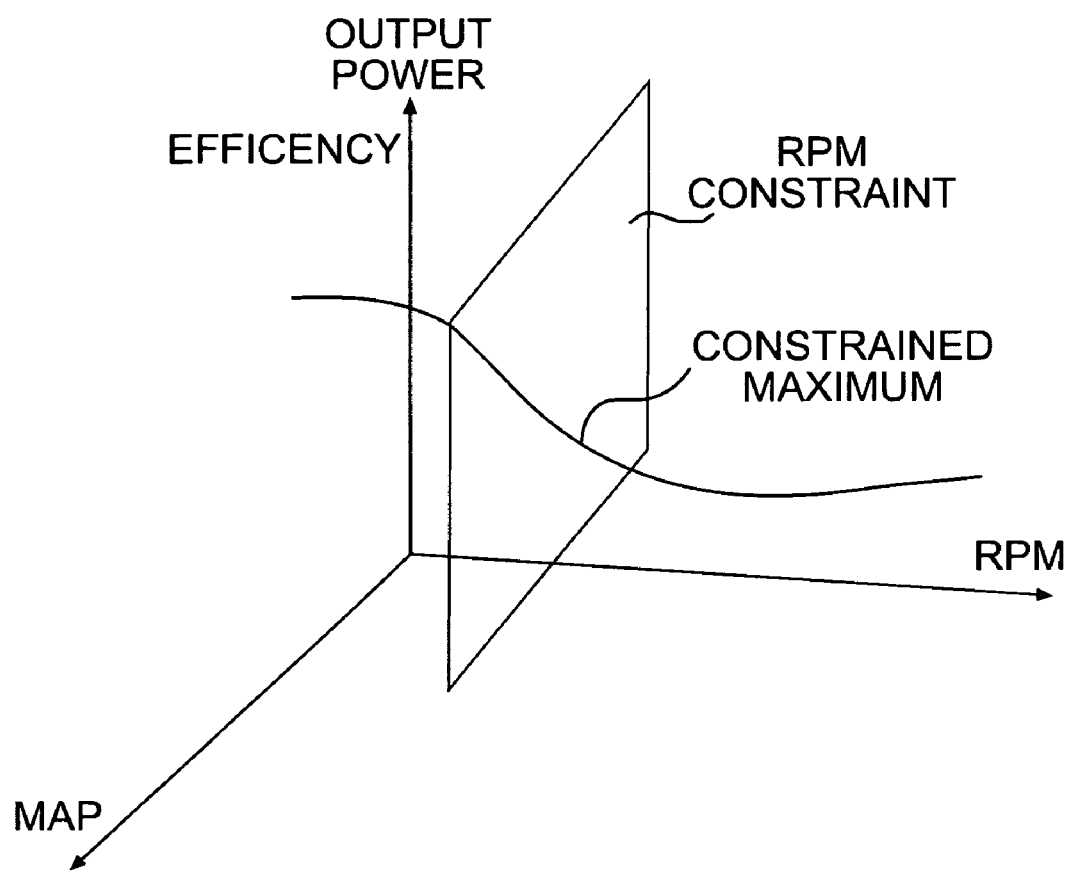
FIG. 7 is a graph showing the constrained maximum output power efficiency in accordance with the embodiment shown in FIG. 1.

Since the final output of the optimization algorithm is a set of RPM and MAP data versus environmental conditions and output power, these data are stored in the FADEC 30 in look-up table form and read directly or interpolated to obtain optimum conditions at any environmental condition and output power. In FIG. 5, a constant-output power contour is obtained for the commanded power output and the detected ambient air operating conditions. This contour is projected onto the RPM-MAP plane. For this example, the contour is represented by a series of points describing intersections with the RPM-MAP grid lines. In FIG. 6, the RPM-MAP contour pairs are mapped onto the output power efficiency curve. The output power contour is re-projected onto the power efficiency surface, and the result of the operation is a discrete 3D curve. In FIG. 7, the maximum output power efficiency may be constrained for safety and other operating conditions. For example, a safe-operating envelope may be imposed on the projected output power efficiency curve, and the maximum output power efficiency within the constraint is located to yield RPM/MAP setpoints to control the engine and propeller.

In more detail, the SIPC described earlier automatically selects MAP and RPM values for a desired power setting, where the MAP and RPM values are predetermined in an off-line optimization process and stored in the FADEC look-up table. This allows the system to get close to the optimum power generation efficiency, except for the effects of uncertainty in the models used in the off-line optimization. The on-line optimization algorithm discussed above fine tunes the base off-line optimization to achieve true optimal power generation efficiency by continually seeking the optimum in real time. This process also corrects for engine/generator wear and part replacements.

Figure 3:
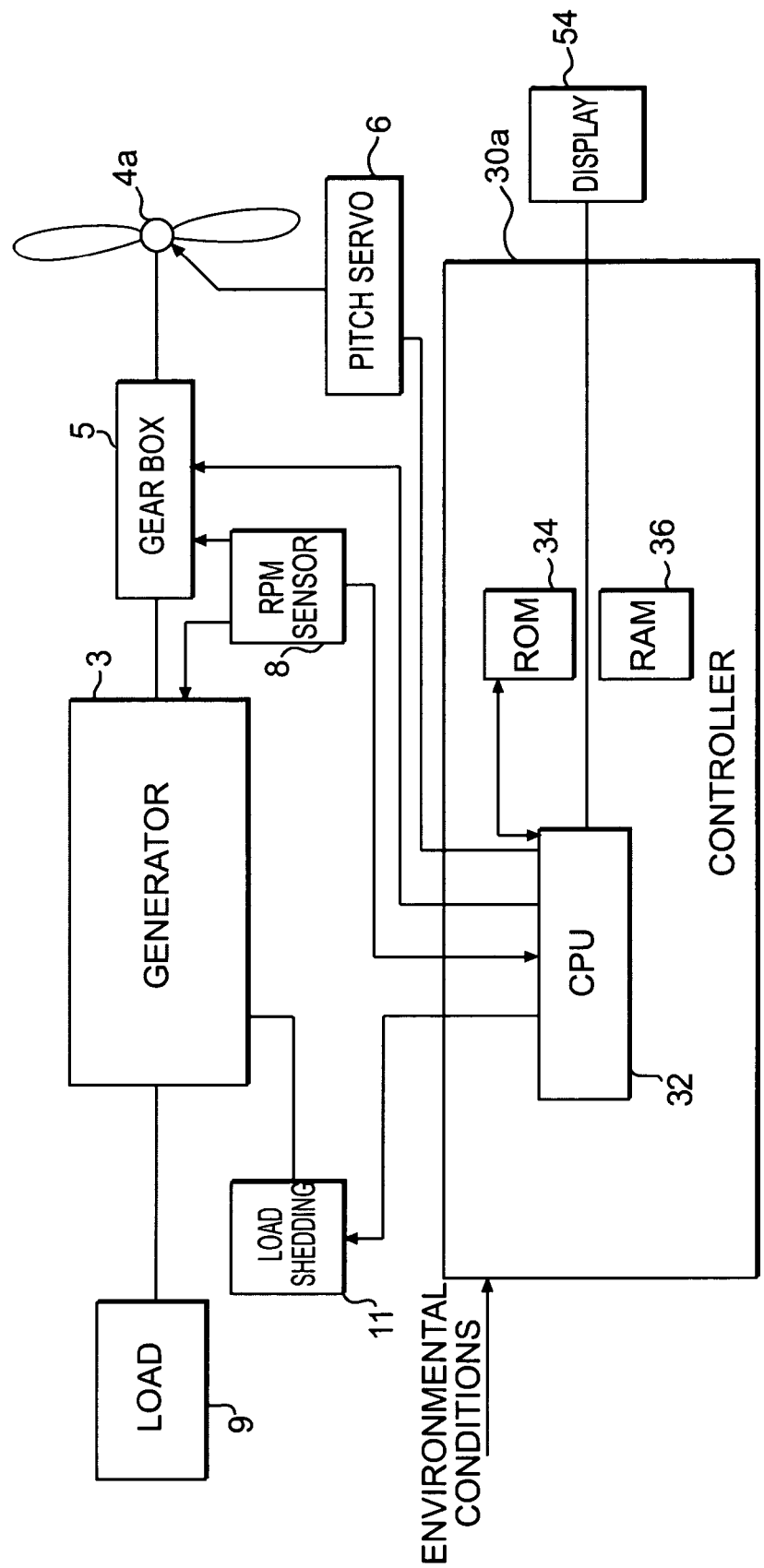
FIG. 3 is a block diagram of the wind turbine control structure according to another embodiment of the present invention.

These control principles apply equally as well in other power generation systems. For example, in the case of a wind turbine, the prime power source 2 is replaced by the wind and a propeller. FIG. 3 (where like items have like numerals) shows a block diagram of a wind turbine system. In this embodiment, a generator 3 is connected to a propeller 4a via a gear box 5. A load 9 is connected to the generator and is comprised of well known electrical transmission means. In this embodiment, environmental conditions are monitored as inputs to controller 30a. A pitch servo 6 is connected to the propeller 4a and is selectably actuated to change the pitch of the propeller blades thereby altering the rotational speed of the propeller. Similar to the previous embodiment, the control algorithm selects the optimum operating speed based on the known performance of the wind turbine and the measured environmental parameters and generates a control signal to the pitch servo 6. Alternatively, the gear box 5 may be a variable speed transmission that may control the operating speed of the generator 3. This gear box control may be in combination with the propeller pitch control or used alone as a means to provide the optimum power generation. A control signal from the controller 30a to the variable speed transmission based on the measured parameters will be provided to select the optimum generator speed for maximum power generation. Still further, it may be advantageous to provide load shedding means 11 connected to the generator 3 to further optimize the operating efficiency of the wind turbine. In this arrangement, CPU 32 would provide a control signal to the load shedding means 11 to change the flow of electrical power in the most efficient manner based on the measured operating parameters and environmental conditions.

Figure 4:
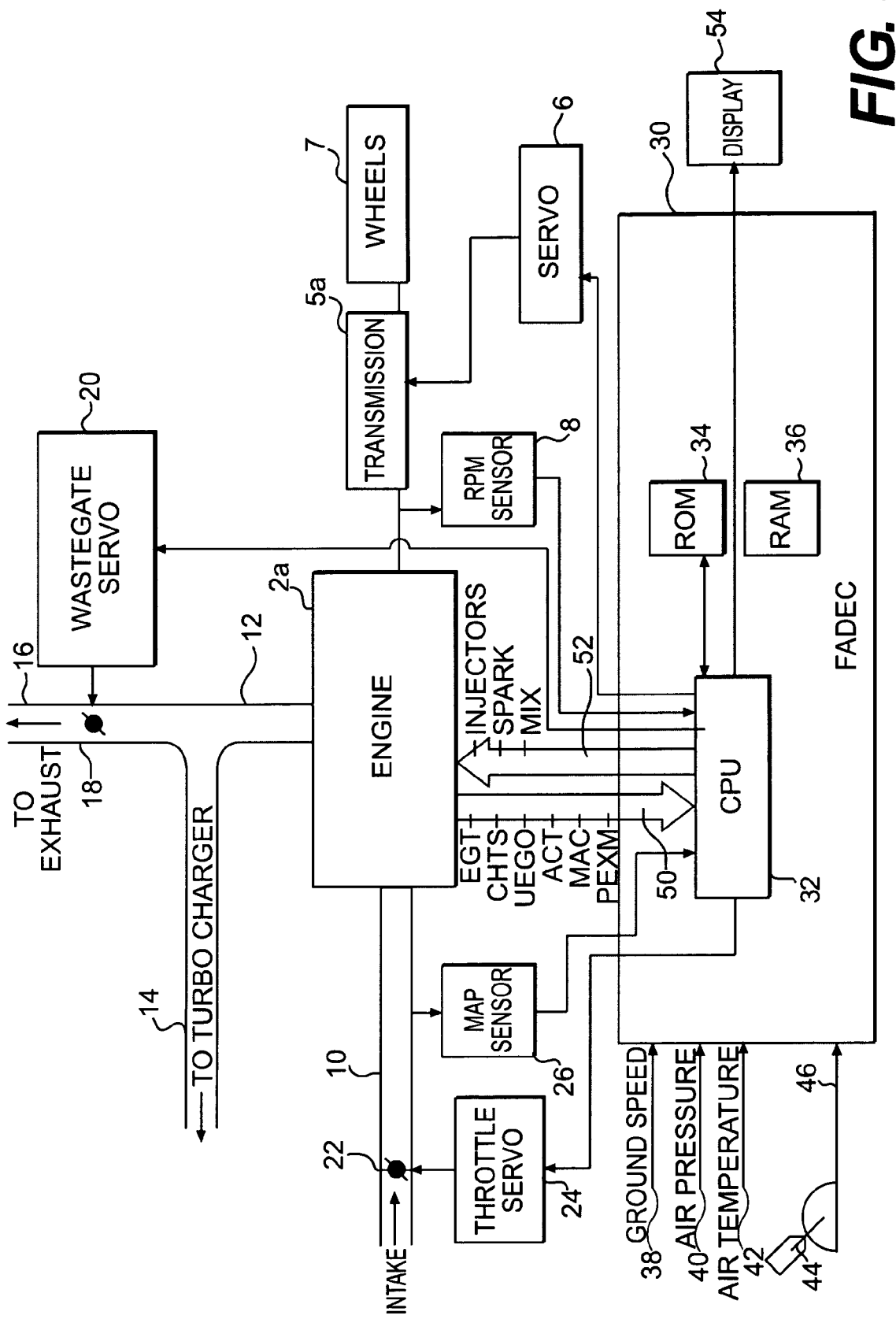
FIG. 4 is a block diagram of another preferred embodiment directed at power generation systems for ground vehicles.

Still further, the aforementioned control system may be applied to ground vehicles. Referring to FIG. 4, where like items have like numerals, a ground vehicle is provided with an engine 2a connected to a transmission 5a. The transmission is connected to a plurality of wheels 7 that are in contact with the ground. The engine 2a consumes fuel and propels the vehicle along the ground in accordance with an input command 44 from an operator. Alternatively, the ground vehicle could be unmanned. Optimum operating setpoints for the engine 2a and transmission 5a are determined based on an algorithm stored on the FADEC 30 as previously discussed. This system could easily be applied to hybrid electrical vehicles, fuel cell powered vehicles, battery powered vehicles and vehicles with continuously variable transmissions. Optionally, a control signal may be provided to the transmission 5a to alter the transmission's settings and further provide a means for optimizing the power generation from the engine 2a.

4. CONCLUSION

The input power controller structure and functions described above can simplify operational tasks and greatly improve engine and power generation performance by selecting the best efficiency for the commanded thrust and detected environmental/operating conditions.

The individual components shown in outline are designated by blocks in the Drawings are all well-known in the engine control arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Single input power control apparatus for controlling a powerplant, comprising:
    an input means for generating an output power command; and
    a processor, coupled to said input means, for
        (i) receiving the generated output power command,
        (ii) receiving a plurality of detected ambient air conditions,
        (iii) receiving a plurality of detected powerplant performance parameters,
        (iv) determining first and second powerplant control commands based on the received output power command, the detected ambient air conditions, and the powerplant performance parameters, and
        (v) outputting first and second output signals respectively corresponding to the first and second powerplant control commands.

2. Apparatus according to claim 1, wherein said detected ambient air conditions include humidity and air pressure.

3. Apparatus according to claim 1, wherein said first powerplant control command comprises a powerplant speed command, and wherein said second powerplant control command comprises a powerplant load command.

4. Apparatus according to claim 3, wherein said powerplant load command comprises a manifold air pressure command.

5. Apparatus according to claim 4, wherein said powerplant speed command comprises a gear box RPM command.

6. Apparatus according to claim 5, wherein said plurality of detected engine performance parameters include gear box RPM and manifold air pressure.

7. Apparatus according to claim 1, wherein said processor
    (i) stores plural sets of first and second powerplant control parameters which yield highest output power efficiency for detected ambient air conditions and output power commands, and
    (ii) selects the one set of first and second powerplant control commands which corresponds to the detected ambient air conditions and the received output power command.

8. Single input power control apparatus for controlling a ground vehicle, comprising:
    an input means for generating an output power command; and
    a processor, coupled to said input means, for
        (i) receiving the generated output power command,
        (ii) receiving a plurality of detected ambient air conditions,
        (iii) receiving a plurality of detected engine performance parameters,
        (iv) determining first and second engine control commands based on the received output power command, the detected ambient air conditions, and the engine performance parameters, and
        (v) outputting first and second output signals respectively corresponding to the first and second engine control commands.

9. Apparatus according to claim 8, wherein said detected ambient air conditions include ground speed and air pressure.

10. Apparatus according to claim 8, wherein said first engine control command comprises an engine speed command, and wherein said second engine control command comprises an engine load command.

11. Apparatus according to claim 10, wherein said engine load command comprises a manifold air pressure command.

12. Apparatus according to claim 11, wherein said engine speed command comprises a gear box RPM command.

13. Apparatus according to claim 12, wherein said plurality of detected engine performance parameters include gear box RPM and manifold air pressure.

14. Apparatus according to claim 8, wherein said processor
    (i) stores plural sets of first and second engine control parameters which yield highest output power efficiency for detected ambient air conditions and output power commands, and
    (ii) selects the one set of first and second engine control commands which corresponds to the detected ambient air conditions and the received output power command.

15. A system for controlling a power generation system, the system comprising:
    an input device configured to generate an output power command; and
    a processor operably associated with the input device, the processor being configured to
        receive the output power command,
        receive an ambient air condition,
        receive a power generation system performance parameter,
        determine a power generation system control command yielding a highest output power efficiency based on the ambient air condition and the output power command, and
        store the power generation system control command and at least one of the ambient air condition, the power output command, and the power generation system performance parameter.

16. A system for controlling a power generation system, the system comprising:
   an input device configured to generate a signal indicative of a desired power output of the power generation system; and
   a processor operatively associated with the input device, the processor being configured to
      receive at least one signal indicative of an ambient air condition and at least one signal indicative of a performance parameter related to the power generation system, and
      output at least one power generation system control command based on the at least one signal indicative of an ambient air condition and the at least one signal indicative of a performance parameter related to the power generation system,
   wherein the at least one power generation system control command is configured to optimize the efficiency of the power generation system based on at least one of the at least one signal indicative of an ambient air condition, the at least one signal indicative of a performance parameter related to the power generation system, and the signal indicative of a desired power output of the power generation system.

* * * * *